3,052,732
PREPARATION OF IODO FLUOROCARBONS
Carl G. Krespan, Wilmington, Del., assignor to E. I. du Pont de Nemours and Company, Wilmington, Del., a corporation of Delaware
No Drawing. Filed Aug. 29, 1960, Ser. No. 52,340
10 Claims. (Cl. 260—648)

This invention relates to, and has as its principal object provision of, a new method for preparing fluoroalkyl iodides and fluorocycloalkyl iodides.

Compounds which contain only carbon and fluorine and optionally hydrogen have been studied very intensely because of their valuable and unique properties. Compounds of this general type containing iodine in addition to fluorine have been investigated to a much lesser degree because simple, generally applicable methods for their preparation have not hitherto been available. Direct substitution of elemental iodine for hydrogen or addition of the same to ethylenically unsaturated compounds is not generally possible. Improved methods for the synthesis of such iodofluorocompounds are desirable, however, because they are useful initiators of chemical reactions, e.g., polymerization of unsaturates, and as intermediates in preparing other fluoro compounds.

According to this invention, fluoroalkyl and fluorocycloalkyl iodides are produced by reacting a fluoroalkene or fluorocycloalkene with iodine and an alkali metal fluoride.

The reaction is preferably effected at temperatures above 50° C., and when gaseous or low boiling fluoroalkenes or cycloalkenes are used, under pressure.

In a suitable procedure for carrying out the process of this invention, a pressure vessel is first flushed with an inert gas, e.g., nitrogen, to remove air and traces of moisture, the vessel is cooled to 0° C., or lower, and is then charged with the fluoroalkene or cycloalkene, alkali metal fluoride, iodine, and an inert reaction medium. The reaction vessel is closed and heated under autogenous pressure with suitable agitation. Generally the reaction temperature will be in the range of 25° to 250° C. Usually, however, the best results from the standpoint of reaction rate and product yield are obtained at 50° to 200° C. and this range is therefore preferred. The time of reaction is determined by the temperature at which the reaction is carried out and by the particular fluoroalkene or fluorocycloalkene reactant employed. The time generally will be between 0.5 and 20 hours, but usually 2 to 15 hours are sufficient.

The reaction can also be carried out in continuous manner by passing the reactants through a heated tube. The pressure used in the batch or continuous process is not critical but will generally lie between 1 and 50 atmospheres or even higher, depending on the reactants, temperature and apparatus used. Increased pressure has the advantage of increasing the concentration of the reactants and permitting larger reaction charges in a given space.

The alkali metal fluorides usefully employed are those of lithium, sodium, potassium, rubidium, and cesium. Examples of suitable fluorides are lithium fluoride, sodium fluoride, potassium fluoride, potassium hydrogen fluoride ($KHF_2$), cesium fluoride, and rubidium fluoride. Potassium fluoride works especially well.

Theoretically the reaction involves the alkali metal fluoride, iodine, and fluoroalkene or fluorocycloalkene in 1:1:1 molar ratio. In practice, however, the alkali metal fluoride is employed in excess, usually in amount corresponding to 2 or more moles per mole of fluoroalkene or fluorocycloalkene.

The use of an inert reaction medium is desirable but not essential. Suitable media are acetonitrile, dimethylformamide, N-methylpyrrolidone, dimethyl sulfoxide, dimethyl sulfone, dimethoxyethane, and the like.

The amount of reaction medium can equal or exceed the fluoroalkene or fluorocycloalkene by 10 or more fold.

The fluoroalkenes and cycloalkenes usefully employable in the process of this invention include tetrafluoroethylene, chlorotrifluoroethylene, vinylidene fluoride, perfluoro-1-butene, 3H-pentafluoropropylene, 4H-heptafluoro-1-butene, 4-chloroheptafluoro-1-butene, perfluoro-2-decene, 12H-perfluoro-1-dodecene, 8-chloropentadecafluoro-1-octene, 1,1,2,3,3-pentafluoro-1-pentene, 1,1,2,3,3-pentafluoro-1-octene octafluoro-2-butene, 8H-perfluoro-1-octene, hexafluoropropylene, hexafluorocyclobutene, octafluorocyclopentene, decafluorocyclohexene, octafluoroisobutene, dichlorovinylidene fluoride, and the like. The preferred fluoroalkenes are those which contain no more than 12 carbon atoms and the preferred fluorocycloalkenes are those which contain no more than 8 carbon atoms.

The fluoroalkyl and cycloalkyl iodides produced in accord with this invention are reactive intermediates, and, in one method for readily converting them to fluorine-containing organometallic compounds, they can be simply dissolved in a suitable organic solvent, such as diethyl ether, dibutyl ether, tetrahydrofuran, etc., and the metal whose derivative is desired is simply added. Reaction takes place either spontaneously or only with slight warming. This reaction results in formation of a compound in which the metal is bonded to the same carbon to which the iodine was bonded, and the iodine appears as the metal iodide by-product. These fluorine-containing organometallics possess unusual chemical and thermal stabilities and are useful in improving the combustion characteristics of petroleum hydrocarbons. The heavy metal derivatives are useful as power transmission liquids, in gear boxes, inertial guidance instruments, etc.

As already stated, the fluoroalkyl and cycloalkyl iodides are also useful as initiators for the polymerization of unsaturated compounds, e.g., ethylene, tetrafluoroethylene, and the like.

The examples which follow are submitted to illustrate but not to limit this invention. In these examples, unless otherwise noted, all pressures are autogenous.

Example I

A mixture of 30 g. (0.20 mole) of hexafluoropropylene, 23.2 g. (0.40 mole) of anhydrous potassium fluoride, 63.5 g. (0.25 mole) of iodine, and 80 ml. of acetonitrile was heated at 100° C. for 10 hours in a 300-ml. shaker tube. Distillation of the reaction mixture, 150 g., gave 36.3 g. (61% conversion of heptafluoroisopropyl iodide, B.P. 39–41° C. The product was analyzed for fluorine and hydrogen by n-m-r and its structure was confirmed as corresponding to $F_3C$—$CFI$—$CF_3$.

Example II 8H-perfluoro-1-octene, B.P. 118–119° C., was prepared by pyrolysis of the sodium salt of ω-H-perfluorononanoic acid at 280–300° C.

A mixture of 57.3 g. (0.15 mole) of 8H-perfluoro-1-octene, 17.4 g. (0.30 mole) of anhydrous potassium fluoride, 50.8 g. (0.20 mole) of iodine, and 80 ml. of acetonitrile was heated at 150° C. for 10 hours under autogenous pressure in a 300-ml. shaker tube. The reaction mixture, 177 g., was distilled to give 34.1 g. of isomerized fluorooctenes, B.P. 45–49° C./70 mm., and 10.5 g. (13% conversion) of 8H-2-iodoperfluorooctane, B.P. 59–60° C./10 mm.

*Analysis.*—Calcd. for $C_8HF_6I$: F, 57.57; I, 24.04. Found: F, 57.75; I, 23.83.

N-m-r for F and H confirmed the structure,

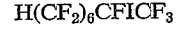

$H(CF_2)_6CFICF_3$

Example III

A mixture of 19.8 g. (0.20 mole) of tetrafluoroethylene, 58.3 g. (0.23 mole) of iodine, 19.7 g. (0.34 mole) of anhydrous potassium fluoride, and 60 ml. of acetonitrile was heated at 150° C. for 10 hours in a 240-ml. tube under autogenous pressure. The reaction mixture, 136 g., was distilled to give 2.1 g. of pentafluoroethyl iodide, volatile at 25° C. (reported B.P. 13° C.), identified by n-m-r. The gases from the reaction that were condensible at −60° C. were shown by n-m-r to be composed of 1.1 g. of $CF_3CF_2I$ and 0.3 g. of octafluorocyclobutane (TFE dimer). The total conversion to pentafluoroethyl iodide was 7% (3.2 g.). Further distillation of the reaction mixture, after it had been washed with one liter of cold water and dried, afforded 27.2 g. (38%) of tetrafluoroethylene diiodide, B.P. 52–54° C./100 mm. This product was identified by comparison of its n-m-r spectrum with that of a known sample.

Example IV

A mixture of 33 g. (0.20 mole) of hexafluorocyclobutene, 23.2 g. (0.40 mole) of anhydrous potassium fluoride, 63.5 g. (0.25 mole) of iodine, and 80 ml. of acetonitrile was heated at 150° C. for 10 hours in a 300-ml. shaker tube. The reaction mixture, 158 g., was distilled to give 18.0 g. of crude product, B.P. 61–66° C. Redistillation afforded 16.4 (27% conversion) of heptafluorocyclobutyl iodide, B.P. 63–64° C. A sample was washed with water, dried, and redistilled to remove any trace of acetonitrile before analysis.

*Analysis.*—Calcd. for $C_4F_7I$: F, 43.19; I, 41.21. Found: F, 43.00; I, 41.06.

The structure was confirmed by n-m-r.

Example V

A mixture of 40.0 g. (0.20 mole) of octafluoro-2-butene, 23.2 g. (0.40 mole) of anhydrous potassium fluoride, 63.5 g. (0.25 mole) of iodine, and 80 ml. of acetonitrile was heated at 150° C. for 10 hours in a 300-ml. tube under autogenous pressure. The reaction mixture, 156 g., was distilled to give crude product, B.P. 60–75° C. This distillate was washed with 500 ml. of water, dried over anhydrous calcium chloride, filtered, and redistilled to give 11.8 g. (17% conversion) of nonafluoro-2-iodobutane, B.P. 65–67° C.; $n_D^{25}$, 1.334, (R. N. Haszeldine, J. Chem. Soc., 3559 (1953) reports B.P. 65.5° C. and $n_D^{20}$ 1.340 for this compound.) N-m-r confirmed the structure of the product.

Example VI

A mixture of 23 g. (0.20 mole) of chlorotrifluoroethylene, 23.2 g. (0.40 mole) of anhydrous potassium fluoride, 63.5 g. (0.25 mole) of iodine, and 80 ml. of acetonitrile was heated at 100° C. for 10 hours in a 300-ml. tube. The dark reaction mixture, 133 g., was distilled to give 5.3 g. (10% conversion) of crude 1-chloro-1,2,2,2-tetrafluoroethyl iodide, B.P. 52–57° C., identified by n-m-r. An analytical sample, B.P. 52–53° C., apparently contained a small amount of impurity.

*Analysis.*—Calcd. for $C_2ClF_4I$: Cl, 13.5; I, 48.3. Cl, 13.5; I, 48.3. Found: Cl, 14.3; I, 45.2.

Example VII

A mixture of 30 g. (0.20 mole) of hexafluoropropylene, 23.2 g. (0.40 mole) of anhydrous potassium fluoride, and 63.5 g. (0.25 mole) of iodine was heated in a 300-ml. tube at 150° C. for 15 hours. Distillation of liquid product from the solid residue gave 3.0 g. (5% conversion) of heptafluoroisopropyl iodide, identified by comparison of the n-m-r-spectrum with that of an authentic sample.

Example VIII

A mixture of 30 g. (0.20 mole) of hexafluoropropylene, 63.5 g. (0.25 mole) of iodine, 16.8 g. (0.40 mole) of sodium fluoride, and 80 ml. of acetonitrile was heated at 150° C. for 10 hours in a 300-ml. tube. Distillation of the reaction mixture, 105 g., gave 0.8 g. (1.4% converation) of heptafluoroisopropyl iodide, B.P. 40–42° C., identified by comparison of the n-m-r spectrum with that of a known sample.

Example IX

A mixture of 27 g. (0.2 mole) of 1,1-dichloro-2,2-difluoroethylene, 63.5 g. (0.25 mole) of iodine, 23.2 g. (0.40 mole) of anhydrous potassium fluoride, and 80 ml. of acetonitrile was heated at 125° C. for 12 hours in a 300 ml. pressure reactor. The reaction mixture, 185 g., was shaken with 1.5 l. of water and 100 ml. of methylene chloride. The lower organic layer was removed, washed with water, and dried over anhydrous calcium chloride. The liquid was filtered, evaporated to low volume, and the washing and drying steps repeated. Distillation of the resulting organic liquid afforded 5.2 g. of 1,1-dichloro-2,2,2-trifluoroethyl iodide, B.P. 58–59° C. (200 mm.). The product was analyzed and calculated for $C_2Cl_2F_3I$: Cl, 25.43%; I, 45.52%. Found: Cl, 25.41%; I, 45.12%.

The n-m-r spectrum for fluorine indicated a single peak in the $CF_3$ region, and this confirmed the structure of the product.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process which comprises reacting iodine with a member of the group consisting of fluoroalkenes of up to 12 carbons and fluorocycloalkenes of up to 8 carbons in the presence of a fluoride of an alkali metal at a temperature of 25–250° C.

2. The process of claim 1 accomplished in an inert organic reaction medium.

3. The process of claim 1 accomplished at autogenous pressure.

4. The process which comprises reacting iodine with hexafluoropropylene in the presence of a fluoride of an alkali metal at a temperature of 25–250° C.

5. The process which comprises reacting iodine with 8-H-perfluoro-1-octene in the presence of a fluoride of an alkali metal at a temperature of 25–250° C.

6. The process which comprises reacting iodine with tetrafluoroethylene in the presence of a fluoride of an alkali metal at a temperature of 25–250° C.

7. The process which comprises reacting iodine with hexafluorocyclobutene in the presence of a fluoride of an alkali metal at a temperature of 25–250° C.

8. The process which comprises reacting iodine with octafluoro-2-butene in the presence of a fluoride of an alkali metal at a temperature of 25–250° C.

9. The process which comprises reacting iodine with chlorotrifluoroethylene in the presence of a fluoride of an alkali metal at a temperature of 25–250° C.

10. The process which comprises reacting iodine with 1,1-dichloro-2,2-difluoroethylene in the presence of a fluoride of an alkali metal at a temperature of 25–250° C.

References Cited in the file of this patent

UNITED STATES PATENTS

| | | |
|---|---|---|
| 2,424,667 | Raasch | July 29, 1947 |
| 2,614,131 | Simons et al. | Oct. 14, 1952 |
| 2,920,111 | Braid et al. | Jan. 5, 1960 |
| 2,975,220 | Hauptschein et al. | Mar. 14, 1961 |

FOREIGN PATENTS

| | | |
|---|---|---|
| 3141/31 | Australia | July 20, 1931 |